United States Patent [19]
Feemster et al.

[11] 3,742,701
[45] July 3, 1973

[54] PROPELLANT INJECTOR ASSEMBLY

[75] Inventors: John R. Feemster, Saratoga; Nils Langenborg, Sunnyvale, both of Calif.

[73] Assignee: The United States of America as represented by the Secretary of the Navy, Washington, D.C.

[22] Filed: June 16, 1971

[21] Appl. No.: 153,723

[52] U.S. Cl. ............... 60/258, 60/251, 60/39.74 A, 239/459, 137/542
[51] Int. Cl. .................................................. F02k 9/02
[58] Field of Search ................... 60/243, 251, 258, 60/39.74 A, 266, 39.74 R; 239/452–454, 456, 459; 137/542, 543

[56] References Cited
UNITED STATES PATENTS

| | | | |
|---|---|---|---|
| 3,227,177 | 1/1966 | Smith | 60/258 X |
| 2,229,467 | 1/1941 | Maxwell | 239/452 |
| 2,582,527 | 1/1952 | Burnett | 239/459 |
| 1,931,761 | 10/1933 | Hertel | 239/456 X |
| 2,972,227 | 2/1961 | Allen | 60/258 |
| 3,529,420 | 9/1970 | Guyot | 60/251 |
| 2,796,296 | 6/1957 | Campbell | 239/452 |
| 3,397,540 | 8/1968 | Scobee | 60/251 |
| 3,249,308 | 5/1966 | Cadiou | 239/453 |
| 3,074,231 | 1/1963 | Klein | 60/39.74 A |
| 3,527,056 | 9/1970 | Hoffman | 60/39.74 A |
| 1,098,884 | 6/1914 | Comstock | 239/456 |
| 2,154,875 | 4/1939 | Streby | 239/452 |

*Primary Examiner*—Carlton R. Croyle
*Assistant Examiner*—Robert E. Garrett
*Attorney*—R. S. Sciascia, Henry Hansen et al.

[57] ABSTRACT

A liquid propellant injector adapted to be installed into a bipropellant thrust chamber, the injector forming an orifice closed by a spring biased valve, wherein the valve and valve seat surfaces form a frustoconical, annular opening upon opening of the valve. The liquid propellant pressure provides the opening force to overcome the valve spring bias, producing a uniform spraying pattern of the liquid propellant outwardly from the injector to combine with a solid propellant.

5 Claims, 2 Drawing Figures

PATENTED JUL 3 1973

3,742,701

INVENTORS
JOHN R. FEEMSTER
BY NILS LANGENBORG

ATTORNEY

PROPELLANT INJECTOR ASSEMBLY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to rocket thrust chambers and more particularly to liquid propellant injector configurations therein.

In bipropellant reaction motors, and more particularly in a reaction motor where one of the propellants is a solid and the second propellant necessary for the combination is a liquid the problem of distributing the liquid propellant evenly throughout the thrust chamber is well recognized by those in the art. It is generally undesirable in liquid-solid propellant combinations, in view of the unstable tendency of the solid propellant, to expose more area and therefore to form a larger combustive combination when combined with an uneven supply of the other propellant, resulting in fluctuations in thrusts which are hazardous to equipment and result in navigation and control errors. Typically the prior art solved this problem by distributing a number of fine and accurately machined injectors throughout the thrust chamber such that the evenness of the liquid propellant distribution was at all times limited by the number of injectors and the accuracy thereof. The requirement of a high number of injectors and the associated relatively small size thereof decreased reliability and made each injector subject to failure. The other problem typically encountered in the manufacture and storage of thrust chambers containing such small injectors is in providing protective covering for the injectors in order to protect from erosive effects of ambient atmosphere and from potential damage from foreign objects entering the thrust chamber. As a result of these problems great expense and effort is typically devoted in a development program of rockets. Some of the techniques developed to protect the relatively small and critical opening size of the existing injectors are thrust chamber sealing and purging, and stringent filtering of particulate contaminants in the liquid propellant.

SUMMARY OF THE INVENTION

Accordingly it is a general purpose and object of the present invention to provide a liquid propellant injector which passes relatively large volumetric rates of liquid propellant and is therefore not subject to restriction due to particulate contaminants in the propellant and which at the same time ejects the propellant over a wide and even area of the thrust chamber. Other objects of the invention are to provide a liquid propellant injector which can survive the high temperatures and pressures in a thrust chamber and which is normally closed when not in use protecting the critical areas thereof from corrosive exposure.

These and other objects are accomplished within the present invention by providing a single injector assembly in a bipropellant thrust chamber for injecting a liquid propellant wherein the injector assembly comprises an orifice closed by a spring loaded valve normally biased to the closed position, which opens in response to the liquid propellant pressure. The valve seat surfaces form a frustoconical, annular opening of a size controlled by the combination of the propellant pressure and spring coefficient of the valve spring such that the relationship between the propellant pressure and the size of the opening is always sufficient to effectively disburse a desired quantity of the propellant throughout the chamber. The exterior of the valve is covered with ablative or insulative coating to protect the elements thereof against the high temperature environment of the thrust chamber.

DESCRIPTION OF THE PREFERRED EMBODIMENT

Figure 1:
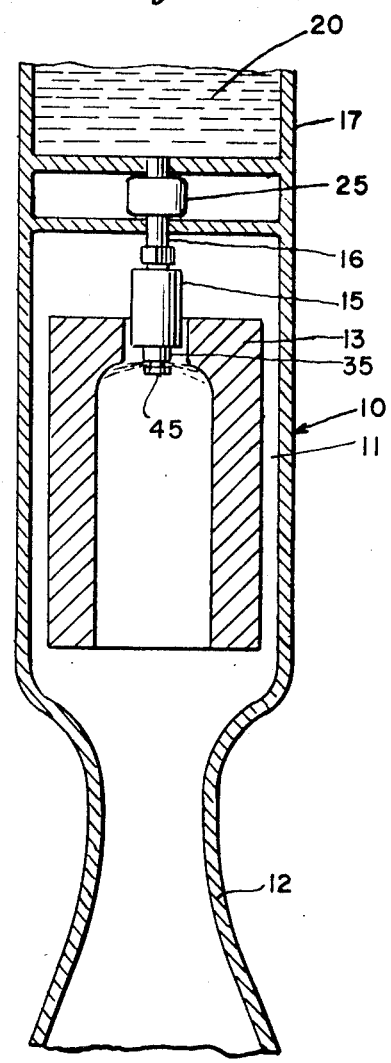
FIG. 1 is a side view, in partial cross section, of a portion of the aft end of a bipropellant rocket assembly having a liquid propellant combining with a solid propellant through an injector constructed according to the present invention.

Referring to FIG. 1 a bipropellant rocket assembly 10 comprises a thrust chamber 11 terminating at the open end thereof in a nozzle 12 having a toroidal solid propellant element 13 contained within chamber 11, the central axis thereof being generally aligned with the central axis of the chamber 11. Extending into the inner cavity of element 13, proximate the forward end thereof, is a single injector 15 connected by a duct 16 at the forward side thereof to a liquid propellant tank 17 containing a liquid propellant 20. Intermediate the ends of cut 16 there is included a liquid propellant pump 25 powered by any well-known means, such as a gas generator, raising the pressure of propellant 20 flowing through duct 16 sufficiently for effective ejection into chamber 11. The ejected propellant 20 is expelled radially from injector 15 as described hereinbelow, partly combining with element 13 at the injection plane with the uncombined portion thereof being carried along by the gas products of the combination to combine further downstream with the other exposed areas of element 13.

Figure 2:
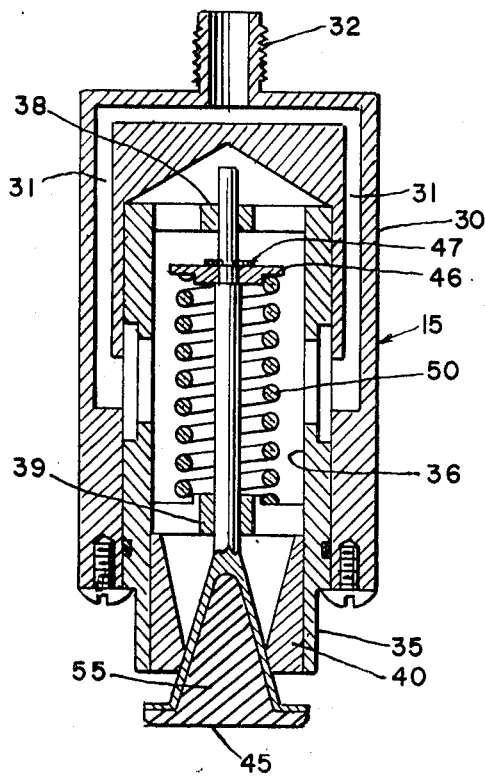
FIG. 2 is a more detailed cross-sectional view of the injector of FIG. 1.

As shown in more detail in FIG. 2 injector 15 includes an outer cylindrical housing 30 the walls thereof containing propellant passageways 31 manifolded from a common propellant feed connector 32 adapted to connect to duct 16 on the forward end of housing 30. Housing 30 forms a cavity open at the lower end thereof generally formed to receive an insertable injector carriage 35. Carriage 35 is perforated laterally to align with the terminal outputs of propellant passageways 31 allowing for unrestricted propellant 20 passage between fitting 32 and a cavity 36 formed with carriage 35. Carriage 35 at the forward end thereof forms a circular guide 38 which is axially aligned with a second guide 39 located proximate the other end thereof and the central axis of housing 30. The other end of carriage 35 is generally shaped into a frustoconical, annular valve seat 40 the central axis thereof also aligning with the central axis connecting guide 38 and guide 39. A valve 45, generally shaped to form a seating surface mating with seat 40, is inserted into the cavity of carriage 35, the valve stem thereof extending through guides 39 and 38. Intermediate the guides 38 and 39 and surrounding the valve stem of valve 45 there is a valve spring retainer 46 attached to the valve stem by a spring lock 47 on the forward side thereof retaining a valve spring 50 compressed between retainer 46 and guide 39. The spring coefficient of spring 50 is selected to keep valve 45 normally closed when not subject to propellant pressure and in combination with the pressure differential between propellant 20 pressure and chamber 11 pressure to provide an optimal separation between valve 45 and valve seat 40. The exterior surface of valve 45 is coated with an ablative coating 55 of sufficient thickness to survive the duration of the burn of element 13.

In operation rocket burn is initiated by activation of pump 25 followed by ignition on the case of a non-hypergolic propellant combination. Pump 25 generates sufficient pressure to open and maintain in the open position valve 45 against the spring bias of spring 50 resulting in a planar injection of the liquid propellant 20 expelled outwardly and away from valve seat 40 to saturate the inner surfaces of element 13 allowing for efficient combination and expansion of the product thereof. Burn time can be discontinued at any desired point by shutting off pump 25 at which time the residual chamber pressure and the spring bias of spring 50 will close the valve preventing possible contamination and corrosion of the critical valve seat 40 area and assuring relatively clean injector surfaces for restart. As shown, the critical injector elements are all contained within the cavity formed by carriage 35 such that easy replacement is accommodated in case of injector failure or field damage. As shown, injector assembly 15 is located proximate the forwardmost end of solid propellant element 13. Accordingly the opening size of injector 15 must necessarily be of sufficient magnitude to permit a liquid propellant flow rate of sufficient quantity to combine with the over-all length of element 13.

Some of the many advantages of the present invention should now be readily apparent. The invention provides a propellant injector which effectively distributes a liquid propellant into a solid propellant cavity in an annular plane assuring relatively even distribution and efficient consumption of the solid. At the same time the injector is normally closed when not in use such that the damage potential thereof is greatly reduced both during the storage stage and shutdown time during a trajectory.

Obviously many modifications and variations of the present invention are possible in the light of the above teachings. It is therefore to be understood that within the scope of the appended claims the invention may be practiced otherwise than as specifically described.

What is claimed is:

1. A liquid propellant injector assembly mounted in one end of a rocket thrust chamber for distributing a pressurized liquid propellant thereinto comprising, in combination:

a first housing having an opening at a first end for receiving the liquid propellant, and an opening at a second end;

a second housing closed at a first end and contained within said first housing, a second end sealingly extending through the opening in the second end of said first housing, said second housing having a plurality of inlet ports intermediate the ends thereof communicating between the interiors of said first housing and said second housing, and having an outlet port at the second end forming an outwardly flaring conical seat;

a valve slidable on an axis in said second housing between the ends thereof having a conical portion registrable with said seat and an annular flange portion juxtapositioned from the second end of said second housing when said valve is fully seated with the proximal side in a plane normal to the axis, and a thermally protective material contained within the conical portion of said valve and covering the distal side of the flange portion for dissipating heat received from the thrust chamber; and force-exerting means urging said valve against said seat;

whereby the conical efflux of pressurized liquid propellant is laterally deflected to impinge upon the wall portion of the one end of the thrust chamber while maintaining thermal insulation of said valve.

2. A liquid propellant injector assembly as set forth in claim 1, further comprising:

said first housing having an internal passageway communicating with the opening at said first end of said first housing, said passageway being formed to direct the liquid propellant exteriorly to said second housing inlet ports.

3. A liquid propellant injector assembly as set forth in claim 2, further comprising:

said second housing being cylindrical and including guide means coaxial therein; and said valve including a stem portion slidable in said guide means.

4. A liquid propellant injector assembly as set forth in claim 3, further comprising:

said thermally protective material being ablative.

5. A liquid propellant injector assembly as set forth in claim 4, further comprising:

said force exerting means including a spring compressible between said guide means and said valve stem.

* * * * *